US009917849B2

(12) United States Patent
Bitton et al.

(10) Patent No.: US 9,917,849 B2
(45) Date of Patent: Mar. 13, 2018

(54) SECURITY SYSTEM FOR PHYSICAL OR VIRTUAL ENVIRONMENTS

(71) Applicant: Fortinet, Inc., Sunnyvale, CA (US)

(72) Inventors: Elie Bitton, Redwood City, CA (US); Alex Samonte, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 839 days.

(21) Appl. No.: 13/953,208

(22) Filed: Jul. 29, 2013

(65) Prior Publication Data

US 2014/0331274 A1 Nov. 6, 2014

Related U.S. Application Data

(60) Provisional application No. 61/818,019, filed on May 1, 2013.

(51) Int. Cl.
*G06F 17/00* (2006.01)
*H04L 29/06* (2006.01)

(52) U.S. Cl.
CPC ...... *H04L 63/1408* (2013.01); *H04L 63/0227* (2013.01)

(58) Field of Classification Search
CPC .................................................. H04L 63/1408
USPC ........................................................... 726/1
See application file for complete search history.

(56) References Cited

U.S. PATENT DOCUMENTS

| 6,157,647 A | * | 12/2000 | Husak | H04L 45/04 370/392 |
| 2012/0204264 A1 | * | 8/2012 | Jiang | H04L 41/12 726/23 |
| 2013/0007839 A1 | * | 1/2013 | Mao et al. | 726/1 |
| 2013/0219500 A1 | * | 8/2013 | Lukas | G06F 21/50 726/23 |
| 2013/0305311 A1 | * | 11/2013 | Puttaswamy Naga | H04L 63/20 726/1 |
| 2014/0282523 A1 | * | 9/2014 | Abidi et al. | 718/1 |

* cited by examiner

*Primary Examiner* — Dant Shaifer Harriman
(74) *Attorney, Agent, or Firm* — Hamilton, DeSanctis & Cha LLP (57) ABSTRACT

Systems and methods for performing intra-zone and inter-zone security management in a network are provided. According to one embodiment, an association is formed by a network security device between a first zone including a first set of devices and a first set of security policies defining a first type of security scanning to be performed on packets originated within the first zone and between a second zone including a second set of devices and a second set of security policies defining a second type of security scanning to be performed on packets originated within the second zone. A first zone packet is received by the network security device. It is determined whether the destination is within the first zone. If so, then the first type of security scanning is performed. A second zone packet is received by the network security device. It is determined whether the destination is within the second zone. If so, then the second type of security scanning is performed.

16 Claims, 8 Drawing Sheets

SECURITY SYSTEM FOR PHYSICAL OR VIRTUAL ENVIRONMENTS

CROSS-REFERENCE TO RELATED APPLICATIONS

This application claims the benefit of U.S. Provisional Application No. 61/818,019, filed on May 1, 2013, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013, Fortinet, Inc.

BACKGROUND

Field

Embodiments of the present disclosure generally relate to providing security in a network. In particular, embodiments of the present disclosure relate to providing inter-zone and intra-zone security in a network.

Description of the Related Art

With ever increasing security threats, network security devices are becoming increasingly important nowadays. Today's security devices provide security solutions such as firewall, Virtual Private Network (VPN), antivirus, Intrusion Prevention (IPS), web filtering, anti-spam, antispyware, traffic shaping, etc. The security solutions provided by the network security devices can be configured according to the requirements of a network. Generally, a network security device can be configured in only one profile and provides the same type of security to the whole network.

However, today's networking environment generally comprises of multiple sub-networks or zones catering to various sub-groups of users, for example, in a company's network, human resources department may form one sub-network, finance department may form another sub-network, and the like, or employees of a company working in one city may belong to a first zone and those working in a second city may belong to a second zone. In this way it is possible to sub-divide a network into sub-networks and zones. It may be required that each sub-network or zone may have a different security profile, for example, financial sites may be accessible to the finance department but not to the human resources department. Therefore, there exists a need to provide a network security device that may be able to configure multiple profiles within the same network security device. Such a network device is required for both a virtual as well as a physical environment.

In addition, until now firewall/unified threat management vendors have used Application Program Interface (API) to provide security in a virtual environment. These APIs are provided by hypervisor companies. However, these APIs are not scalable and not available on all hypervisors.

Therefore, in view of the foregoing, there exists an opportunity for providing a method for securing inter-zone and intra-zone traffic in a virtual as well as a physical network.

SUMMARY

Systems and methods for providing intra-zone and inter-zone security management in a physical as well as a virtual network are described. According to one embodiment, an association is formed by a network security device between a first zone including a first set of devices and a first set of security policies defining a first type of security scanning to be performed on packets originated within the first zone (first zone packets) and between a second zone including a second set of devices and a second set of security policies defining a second type of security scanning to be performed on packets originated within the second zone (second zone packets). A first zone packet originated by a device of the first set of devices is received by the network security device. It is determined whether the destination is within the first zone. If so, then the first type of security scanning is performed. A second zone packet originated by a device of the second set of devices is received by the network security device. It is determined whether the destination is within the second zone. If so, then the second type of security scanning is performed.

Other features of embodiments of the present invention will be apparent from the accompanying drawings and from the detailed description that follows.

BRIEF DESCRIPTION OF THE DRAWINGS

Embodiments of the present disclosure are illustrated by way of examples, and not by the way of any limitation, in the figures of the accompanying drawings and in which like reference numerals refer to similar elements and in which.

DETAILED DESCRIPTION

Systems and methods for providing security in a network are described. According to one embodiment, a network security device includes one or more threat management modules for inspecting data packets exchanged in the network. The one or more threat management modules function as independent units. Each threat management module has threat management policies/security profiles associated with the threat management module. Thereby, enabling one network security device to have multiple security profiles. These profiles have instructions that specify how to manage communications between computing devices.

In accordance with one embodiment, the network security device includes two types of threat management modules, i.e., a layer 2 module and a layer 3 module. The layer 2 module is used for monitoring and managing communications between computing devices located within the same zone. These two computing devices may be located on separate Local Area Networks (LAN) in a physical network. Alternatively, these two computing devices may be two virtual machines located on separate Virtual Local Area Networks (VLANs). Further, the layer 3 module is used for monitoring and managing communications between computing devices in different zones.

The layer 2 module and the layer 3 module manage the communications between computing devices according to the security policies associated with them. Based on the policy, the layer 2 module and the layer 3 module may allow, deny, or log information regarding the communications between the computing devices. In this way, the network security device secures intra-zone and inter-zone traffic in the network. In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "virtual local area network" or the acronym "VLAN" generally refers to a logical grouping of workstations, clients and/or servers on one or more local area networks (LANs) regardless of where they are physically located. For example, endpoints within a particular VLAN may be logically grouped together as a result of being associated with the same department of an enterprise, being used by the same types of end users, having the same primary application, having common security requirements and the like. Each logical grouping of devices is configured (using management software, for example) to allow them to communicate among each other as if they were within the same broadcast domain, when in fact they are located on a number of different LAN segments.

The term "zone" generally refers to a logical grouping of computing devices, virtual machines and/or VLANs. Each zone is separated from others by firewalls and by access policies to ensure that there is no unwanted user access or flow of data.

The phrase virtual machine (VM) generally refers to a software implementation of a machine (e.g., a computer) that executes programs like a physical machine. Virtual machines are separated into two major categories, based on their use and degree of correspondence to any real machine. A system virtual machine provides a complete system platform which supports the execution of a complete operating system (OS). And, a process virtual machine is designed to run a single program, which means that it supports a single process. An essential characteristic of a virtual machine is that the software running inside is limited to the resources and abstractions provided by the virtual machine.

The phrase "virtual network" generally refers to a computer network in which topology has nothing to do with physical connections between participating nodes.

If the specification states a component or feature "may", "can", "could", or "might" be included or have a characteristic, that particular component or feature is not required to be included or have the characteristic.

Figure 1:
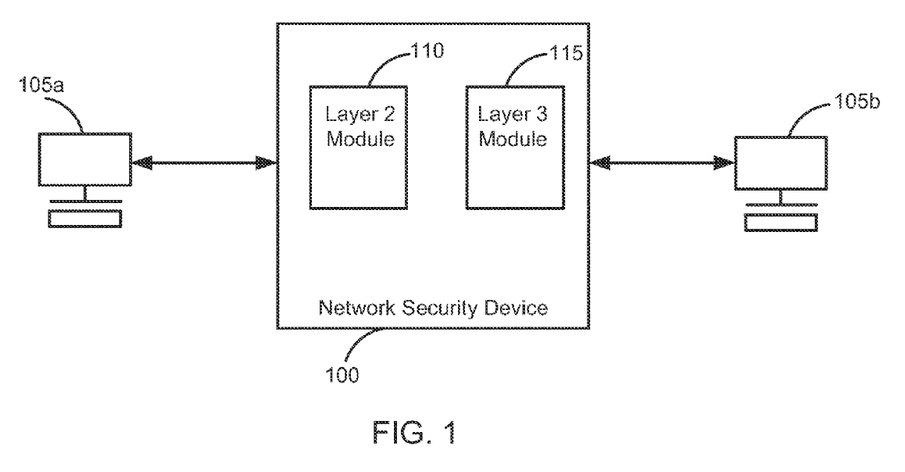
FIG. 1 is another exemplary network security device in accordance with an embodiment of the present invention may be employed.

FIG. 1 is a block diagram illustrating an exemplary network security device 100 in accordance with an embodiment of the present disclosure. Network security device 100 is coupled to a computing device 105a and a computing device 105b. Network security device 100 monitors any communication between computing device 105a and computing device 105b. Computing device 105a and computing 105b are capable of communicating with each other over a network (not shown in FIG. 1). Examples of a computing device, such as computing device 105a and computing device 105b include, but are not limited to a computer, a laptop, a mobile device, a Personal Digital Assistant (PDA), a virtual server, a virtual machine, a widget, and the like. Computing device 105a and computing device 105b send and receive data packets from each other over the network. The network may be any communication network such as, but not limited to, a Local Area Network (LAN), a Wide Area Network (WAN), the Internet, a Metropolitan Area Network (MAP), and the like. Any data packet transmitted between computing device 105a and computing device 105b over the network is scanned by network security device 100. While in this simplified example, only two computing devices, i.e., computing device 105a, computing device 105b, are shown as communicating with each other, however, it should be understood that network security device 100 may be coupled to more than two computing devices in the network. Therefore, all the data packets transmitted between the computing devices within the network are monitored through network security device 100. In the example of FIG. 1, computing device 105a sends a data packet to computing device 105b. The data packet passes through network security device 100. Network security device 100 may be implemented as a gateway device or a FortiGate® device.

Network security device 100 actively scans and analyzes the data packet sent from computing device 105a to computing device 105b for security threats. The step of scanning may include one or more of performing a packet-based inspection, a flow-based inspection, or a proxy-based inspection of the data packets. The packet-based inspection involves examining data part and optionally header of a data packet. The data part and the header are searched for protocol compliance/non-compliance, virus, spam, intrusion, or any other defined criteria to decide whether the data packet should be allowed a pass, or should be routed to a different destination, or should be observed for collecting statistical information. Similarly, the flow-based inspection samples multiple data packets in one session. Thereafter, sampling is done in multiple sessions and pattern matching technique is used to determine the activity being performed by the session. Therefore, any potential threats are identified using pattern matching technique. Apart from the two inspection techniques mentioned above, the proxy-based inspection technique involves reconstructing content of the data packet in response to passing of the data packet from source to destination to determine any security threats within the data packet. Thus, by using these inspection techniques network security device 100 detects security threats in the data packets.

In accordance to the present embodiment, network security device 100 includes one or more threat management modules for performing inspection of the data packets exchanged in the network. The one or more threat management modules are virtual units that function as multiple independent units. The one or more threat management modules enable dividing a physical network security device into multiple virtual network security devices. Further, different threat management policies may be incorporated with each threat management module. Therefore, different security profiles may be configured with different threat management modules. As a result, one network security device may be used for multiple security profiles.

In the present embodiment, network security device 100 includes two threat management modules which are a layer 2 module 110 and a layer 3 module 115. Layer 2 module 110 is 802.1Q compliant and functions as a layer 2 or a data link layer switch. As a layer 2 device, layer 2 module 110 tags and forwards VLAN traffic or receives and removes tag from incoming VLAN traffic. In addition, multiple VLANs including trunk links can be configured on Layer 2 module 110. Trunk links are used to connect switches to other switches or routers and are used to carry VLAN traffic from multiple VLANs. Layer 3 module 115 functions as a router or a network layer device. Similar to layer 2 module 110, layer 3 module 115 is also 802.1Q compliant. As a layer 3 device, layer 3 module 115 adds, reads and removes tags. In addition, layer 3 module 115 also analyzes data frames and its contents. Based on the analysis layer-3 module 115 changes the VLAN tag and forwards the analyzed data frame to a different VLAN, if required; sends the analyzed data frame to a regular non-VLAN-tagged network or forwards the analyzed data frame to the same VLAN.

In addition, layer 2 module 110 and layer 3 module 115 also include different security profiles for monitoring communication within the network. In an embodiment, for management and monitoring of communication between two computing devices which are located in different zones of the network, network security device 100 uses layer 3 module 115. Further, management and monitoring of communication between two computing devices located in same zone of the network is achieved by using layer 2 module 110. A zone is further division of a network based on physical or virtual resources. For example, in physical network, a zone may comprise a sub-net, or one or more local area networks (LAN). Similarly, for virtual networks with a plurality of virtual machines, a zone may comprise multiple virtual local area networks (VLANs), and so forth. In various embodiments of the invention, layer 2 module 110 and layer 3 module 115 also include different functions in addition to having different security profiles. These functions include but are not limited to a switching function for layer 2 module 110 and a routing function for layer 3 module 115.

In an exemplary embodiment, consider that computing device 105a and computing device 105b are located in same zone of the network. Therefore, data packets exchanged between computing device 105a and computing device 105b are monitored by network security device 100 using layer 2 module 110. Layer 2 module 110 is configured with a security profile to perform a full unified threat management (UTM) scan and a next generation firewall (NGFW) scan on the data packets. The UTM scan includes, but is not limited to, performing checks like antivirus scanning, Intrusion Prevention System (IPS), Anomaly protection (DoS policies), One-armed IPS (Sniffer policies), content filtering, Web filtering, E-mail filtering, including protection against spam and grayware, Data Leak Prevention (DLP), Application Control (for example, IM and P2P). Further, the NGFW scan includes, but is not limited to, stateful firewall inspection, intrusion prevention, automated impact assessment and policy tuning, application control, network behavior analysis, real-time network and user intelligence, sensitive data filtering, information technology (IT) policy compliance, uniform resource locator (URL) filtering (optional), and the like. In addition, layer 2 module 110 operates in a transparent mode. In the transparent mode all the interfaces belong to the same LAN segment and network settings need not be changed when another transparent device is added to the network. Optionally, other modes that provide the same functionality may be used to configure security profiles of layer 2 module 110. Thereby, making it possible to provide security within a zone.

In order to perform the full UTM scan and the NGFW scan, layer 2 module 110 uses flow based inspection and proxy based inspection. Based on these inspections, layer 2 module 110 determines policy associated with the data packet. The policy associated with the data packet defines the way in which data packet should be handled. The policy may be based on source computing device, destination computing device, content of the data packet, and the like. With each policy, instructions on managing the data packet are given. Therefore, on determining the policy associated with a data packet, layer 2 module 110 manages the data packet according to the instructions stored within layer 2 module 110. For example, layer 2 module 110 may allow the data packet to be transmitted to destination computing device 105*b*, if the content of the data packet is determined to be secure. Or layer 2 module 110 may deny the data packet to be transmitted to the destination computing device 105*b*, if the data packet is determined to be containing some security risk. Alternatively, layer 2 module 110 may log information related to all data packets passing through it. In some embodiments, layer 2 module 110 may log data related to the data packets that are not allowed to be transmitted. Similarly, there may be many instructions such as allowing only one way transmission of data packets during a communication session, authenticating each time a data packet is received from a particular user, etc. These are some of the examples describing the way in which layer 2 module 110 manages data.

In another exemplary embodiment, consider that computing device 105*a* and computing device 105*b* are located in different zones of the network. In this case the data packet goes through local layer 2 module 110 first, then exchanges between computing device 105*a* and computing device 105*b* are monitored by network security device 100 using layer 3 module 115. Layer 3 module 115 operates in the network address translation (NAT)/route mode. In NAT/Route mode, layer 3 module 115 is visible to the network. Layer 3 module 115 includes multiple interfaces which belong to different zones. Each interface is connected to the network and is configured with an internet protocol (IP) address, valid for corresponding zone. Alternatively, other modes providing the same functionality may be used to configure security profiles in layer 3 module 115. Layer 3 module 115 scans the data packets to provide security management between zones in the network.

These security scans may include a NGFW scan and a UTM scan. To perform these scans layer 3 module 115 uses stateful inspection, flow-based inspection and proxy-based inspection. Based on these inspections, layer 3 module 115 determines application, user and content of the data packet. Details related to the data packets such as, source interface/zone, source address, destination interface/zone, destination address, schedule and time of the session's initiation, and service and port numbers of the data packets may be analyzed to determine application, user, and content of the data packet. These three attributes help in configuring policies and settings associated with a particular type of data packet originating from a specific source. These policies and settings are configured during the initial set-up process of layer 3 module 115. These policies and settings help in determining how the data packet should be handled. The policies and settings include firewall policies, UTM policies, Virtual Private Network (VPN) settings, and the like. In addition, layer 3 module 115 also stores the instructions that need to be followed when an incoming data packet matches any one of the policies stored in layer 3 module 115. The policy instructions may also include network address translation (NAT), or port address translation (PAT), or using virtual IPs or IP pools to translate source and destination IP addresses and port numbers. The policy instructions may specify application-layer inspection and other protocol-specific protection and logging, as well as IPS inspection at the transport layer.

When an incoming data packet is received at layer 3 module 115, layer 3 module 115 analyzes the data packet and locates a security policy matching the data packet. Once layer 3 module 115 locates the security policy corresponding to the data packet, layer 3 module 115 manages the data packet.

In order to manage the data packet, layer 3 module 115 may perform one or more of dropping, accepting, processing, logging or authenticating action on the data packets as directed by the instructions associated with the policy. The instructions may be stored in layer 3 module 115 or may be stored in a memory (not shown). For example, in one embodiment, a policy instruction in layer 3 module 115 may permit data packet to be transmitted to computing device 105*b*, and may also include other packet processing instructions, such as authenticating the data packet, or virus scanning the data packets. In another embodiment, the policy instruction may instruct layer 3 module 115 to drop the data packets received from a particular source computing device, and optionally log information related to the dropped data packets. It should be noted that if no security policy matches the incoming data packet, the data packet is dropped. In addition, layer 3 module 115 may apply a tunnel mode Internet Protocol Security (IPsec) VPN or Secure Sockets Layer (SSL) VPN tunnel on the data packets during a communication session, and may optionally apply NAT and allow traffic for one or both directions. If permitted by the firewall encryption policy, a tunnel may be initiated automatically whenever a packet matching the policy arrives at layer 3 module 115. Further, as discussed before, layer 3 module 115 also performs the routing function. Layer 3 module 115 removes VLAN tag from data packet on receiving the data packet. Then based on the examination of source and destination addresses, protocol, and port associated with the data packet, layer 3 module 115 decided whether the data packet should be forwarded to another VLAN, sent to a regular non-VLAN-tagged network, just forwarded to the same VLAN, or discarded if the firewall policies instruct it to do so.

Therefore, based on the inspection by layer 2 module 110 or layer 3 module 115, a policy associated with the data packet is identified. Thereafter, the data packet is managed according to the instructions associated with the identified policy. The instruction may allow the data packet to be sent to the destination computing device, drop the data packet, or may log information related to the data packet and allow/deny sending the data packet to the destination computing device. In this way, network security device 100, using layer 2 module 110 and layer 3 module 115, provides intra-zone and inter-zone security in the network.

Before describing an exemplary virtual environment, it is helpful to understand the concepts of Virtual Local Area Networks (VLANs) and virtual domains (VDOMs). VLANs use ID tags to logically separate physical and/or virtual devices on a network into smaller broadcast domains. These smaller domains forward packets only to devices that are part of that VLAN domain. This reduces traffic and increases network security. In contrast, VDOMs are a method of dividing a physical network device (e.g., a gateway appliance) into two or more virtual units that function as multiple independent units. In this manner, VDOMs can provide separate firewall policies and in NAT/route mode, completely separate configurations for routing and VPN services for each connected network or organization. In one embodiment, full UTM security may be provided to inter-virtual machine (VM) traffic for VMs on the same layer 2 broadcast domain using layer 2 virtual domains (VDOMs) and without the use of special APIs or integration into the hypervisor. Layer 3 VDOMs can be used to secure traffic between layer 2 zones. Similar results can be achieved on physical networks by combining layer 2 and layer 3 VDOMs on a physical gateway appliance (e.g., one of the FORTIGATE family of network gateway appliances) to secure traffic between two physical machines on the same layer 2 broadcast domain and between layer 2 zones as well.

Figure 2A:
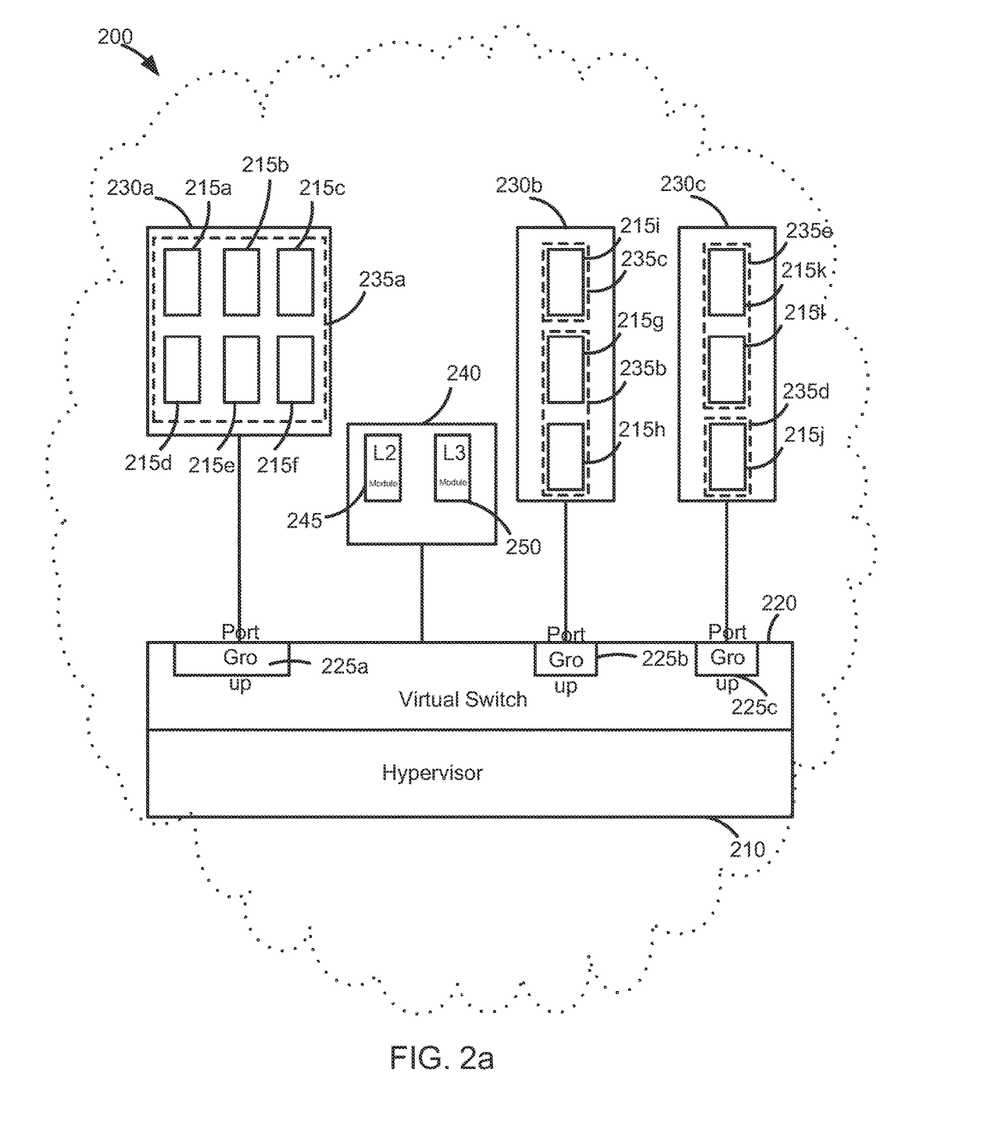
FIG. 2a is a block diagram conceptually illustrating an exemplary virtual environment in which various embodiments of the present invention may be employed.

FIG. 2a is a block diagram conceptually illustrating an exemplary virtual environment 200 in which embodiments of the present invention may be employed. Virtual environment 200 includes a hypervisor 210 and a plurality of virtual machines, such as a virtual machine 215a, a virtual machine 215b, and a virtual machine 215n. As known in the art, a virtual machine is a self-contained operating environment that behaves as a separate computing device. Each of the plurality of virtual machines is connected to hypervisor 210 through a virtual switch 220. Virtual switch 220 further includes a plurality of port groups, such as port group 225a, port group 225b, and port group 225c. The plurality of virtual machines are hosted by hypervisor 210. Hypervisor 210 may be a hosted or native virtual machine monitor that creates and runs the plurality of virtual machines. For example, hypervisor 210 may load the plurality of virtual machines with a client operating system and allocates appropriate amount of resources, such as memory, CPU usage, network bandwidth, and disk space to the plurality of virtual machines. In other words, all the administrative functions are performed by hypervisor 210.

Apart from hypervisor 210, virtual switch 220 is used to establish communication between the plurality of virtual machines. Each of the plurality of virtual machines is connected with virtual switch 220 through a port group. Therefore, the plurality of port groups in virtual environment 200 provide logical connection points among the plurality of virtual machines and between other virtual and physical devices. Each virtual machine is connected to at least one port group. For example, as shown in FIG. 2a, virtual machine 215a to virtual machine 215f are connected to port group 225a, virtual machine 215g to virtual machine 215i are connected to port group 225b, and virtual machine 215j to virtual machine 215l are connected to port group 225c.

Set of virtual machines connected to one port group form a zone. For example, virtual machine 215a to virtual machine 215f form zone 230a. Similarly, virtual machine 215g to virtual machine 215i form zone 230b and virtual machine 215j to virtual machine 215l form zone 230c. Moreover, within each zone one or more virtual machines maybe logically grouped to form VLANs. In the example of FIG. 2a, virtual machine 215a to virtual machine 215f form VLAN 235a, virtual machine 215g to virtual machine 215h form VLAN 235b, and so forth VLAN 235c, VLAN 235d, and VLAN 235e are formed. These VLANs enable LAN to be segmented into different broadcast domains. Thereby, enabling faster communication between the plurality of virtual machines. It can be observed that VLAN 235b and VLAN 235c are in same zone 230b and VLAN 235d and VLAN 235e in another zone 230c.

In addition, virtual environment 200 includes a network security device 240 to monitor communication between the plurality of virtual machines. In an embodiment, network security device 240 may be a separate entity coupled to virtual switch 220 such that all data packets communicated from one virtual machine to another virtual machine traverse through network security device 240. In another embodiment, network security device 240 may be present as integrated within virtual switch 220.

Network security device 240 may be divided into plurality of threat management modules which are capable of providing security management with different security profiles. These threat management modules are configured to cater to the plurality of virtual machines based on inter-zone and intra-zone location of the virtual machines. In an embodiment, intra-zone communication, i.e. communication between virtual machines in different VLANs but the same zone, may be taking place. In such a case, layer 2 module 245 provides security management. Layer 2 module 245 operates in a transparent mode and performs a flow-based inspection and a proxy based inspection.

Using these inspection techniques, layer 2 module 245 performs full unified threat management (UTM) scan and next generation firewall (NGFW) scan. Layer 2 module 245 scans the traffic for possible security threats and manages the treats. For example, layer 2 module 245 stores a virus signature database that identifies individual viruses. When a match is found, layer 2 module 245 may not allow the infected data packet to be forwarded to the destination. Further, layer 2 module 245 may optionally store the infected data packet for further examination and analysis. In another example, layer 2 module 245 examines data traffic for matches to the configured intrusion prevention system sensors and application control list. When a match is found, then matches may be logged and all data packets related to the match may be dropped. In this way, layer 2 module 245 provides security protection for inter-virtual machine traffic.

For example, consider that virtual machine 215h is in communication with virtual machine 215i. It should be noted that virtual machine 215h and virtual machine 215i are in zone 230b but are part of different VLANs. Virtual machine 215h belongs to VLAN 235b and virtual machine 215i belongs to VLAN 235c. Now, virtual machine 215h transmits data packets to virtual machine 215i. The data packets before reaching virtual machine 215i pass through network security device 240. Network security device 240 analyses the data packet and determines that destination virtual machine of the data packet is in the same zone as transmitting virtual machine. Therefore the scanning is performed by layer 2 module 245. Layer 2 module 245 determines, based on the data packet's attributes, a policy associated with the data packet. In accordance to the present example, the policy associated with the data packet may instruct layer 2 module 245 to drop the data packet because it may be coming from an unauthenticated source. As a result, layer 2 module 245 may drop the data packet and the data packet is not sent to virtual machine 215i. Thereby, providing security within zone 230b in virtual environment 200.

In another embodiment, inter-zone communication, i.e. communication between virtual machines in different zones, may be taking place. Herein, layer 3 module 250 provides inter-zone security management. Layer 3 module 250 performs a next generation firewall (NGFW) scan and a UTM scan. Thereby, securing traffic between the zones within virtual environment 200.

To perform these scans, layer 3 module 250 parses the data packets to identify application, user and content of the data packets. The application identification techniques include application protocol detection and decryption, application protocol decoding, application signatures, and heuristics. Layer 3 module 250 may use any of these techniques to correctly identify the application that is being used. Further, user identification links IP addresses to specific user activity. User identification enables visibility as the network is able to detect users using a particular application, transmitting a particular content or creating security issues in the network. Moreover, user identification allows control of network activity on a per-user basis. User identification includes at least one of login monitoring, role discovery, end station polling, and captive portal. Content identification enables real-time prevention of threats within permitted traffic, control of Web surfing activities, file and data filtering. In layer 3 module 250 a rule or policy is associated with each of the combination of application used, user identity, and content. A network administrator defines the security policies and firewall addresses associated with a zone during setting up of the zone. The policy may be at least one of allow or deny; allow but scan for exploits, viruses, and other threats; allow based on schedule, users, or groups; decrypt and inspect; apply traffic shaping through QoS; apply policy-based forwarding; and allow certain application functions.

Upon parsing the data packets, application, user, and content of the data packets may be identified. On identification, policy related to the data packet is determined. These policies may be stored in layer 3 module 250. Network security device 240 retrieves policies and manages the data packet based on the instructions given in the policy. Subsequently, the data packets are sent to the destination virtual machine. Therefore, network security device 240 is able to monitor traffic, block external probes, defend against denial of service attacks, inspect traffic and also inspect content and perform filtering. In this way, layer 3 module 250 provides inter-zone security in virtual environment 200.

As an example of the present disclosure consider virtual machine 215a present in VLAN 235a and belonging to zone 230a is in communication with virtual machine 215g present in VLAN 235b and belonging to zone 230b. Virtual machine 215a transmits a data packet to virtual machine 215g. The data packet passes through a network security device 240. At network security device 240, it is determined that destination virtual machine 215g is in a different zone as transmitting virtual machine 215a. Based on the determination, the inter-zone data packet first goes through layer 2 scanning at layer 2 module 245 and then the data packet is allocated to layer 3 module 250 for scanning Layer 2 module 245 and layer 3 module 250 perform a NGFW scan and a full UTM scan on the data packets. Layer 2 module 245 and layer 3 module 250 determine an appropriate policy for the data packet based on the scanning. Further, layer 2 module 245 and layer 3 module 250 manage the data packets according to instructions given in the policy. In accordance to the present example, the data packet does not contain any security threat and the policy associated with the data packet allows the data packet to be sent to destination virtual machine 215g. Therefore, the data packet is transmitted to destination virtual machine 215g. In this way, network security device 240 provides security when virtual machine 215a and virtual machine 215g are communicating with each other.

Further, in yet another exemplary embodiment of the present disclosure a virtual network comprises a first VLAN present in a first zone and a second VLAN present in a second zone. It should be noted that three threat management modules will be associated with such an arrangement. The first threat management module would be a layer 2 module which will manage data flowing within the first zone. The second threat management module will be a layer 2 module which will manage data flowing within the second zone. And third threat management module will be a layer 3 module which will manage data flowing between the first zone and the second zone. Moreover, whenever a new VLAN is to be added to the network, network security device 240 is configured to add the new VLAN. Therefore, each VLAN will have a threat management module associated with it. Moreover, network security device 240 may be configured by a network administrator or the process of configuration may be automated. This type of arrangement eliminates the need to change the configuration of other threat management modules. Network security device 240 is capable of performing scans on the data traffic passing through it.

In this way, network security device 240 secures inter zone and intra-zone traffic. Moreover, network security device 240 provides complete network segregation at both layer 2 and layer 3. And is able to mix transparent and NAT/route virtual security systems to protect virtual machines.

Figure 2B:
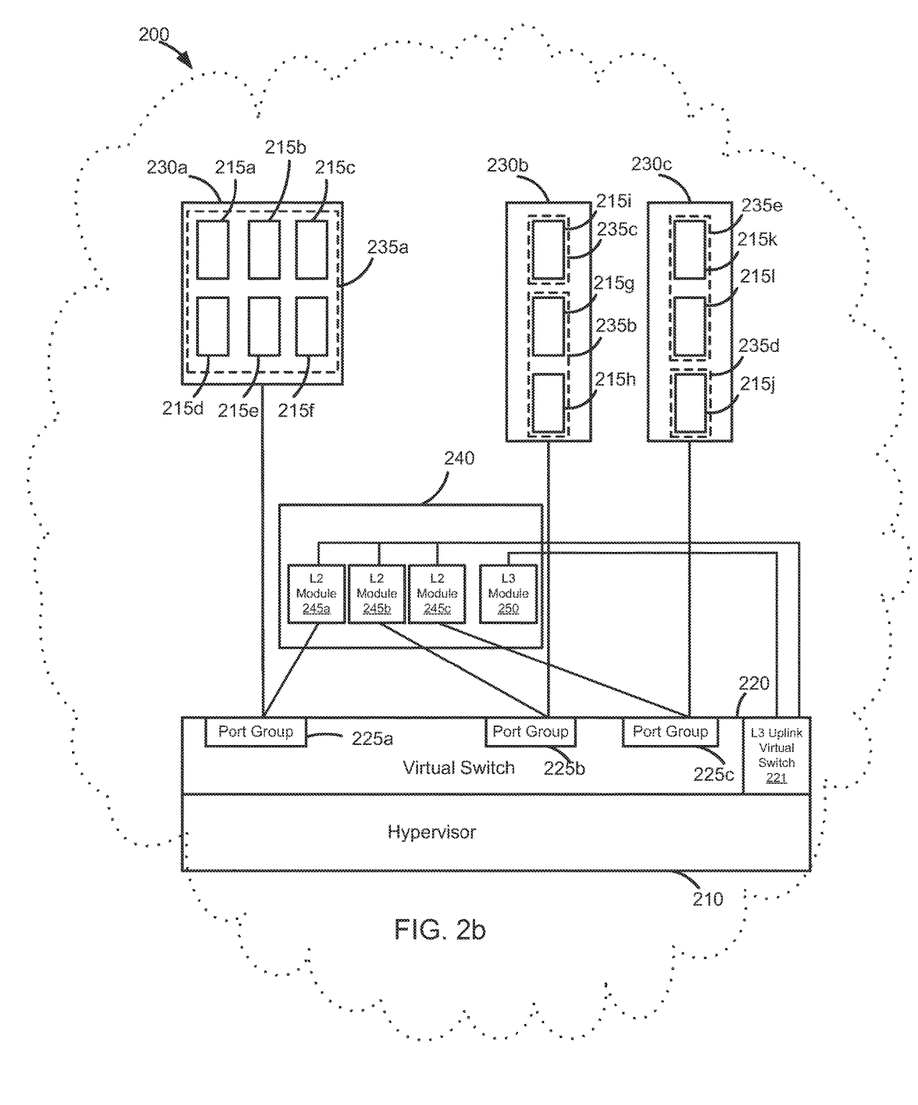
FIG. 2b is a block diagram conceptually illustrating an exemplary virtual environment in which various embodiments of the present invention may be employed.

FIG. 2b is a block diagram conceptually illustrating an exemplary virtual environment 200 in which embodiments of the present invention may be employed. The virtual environment 200 in FIG. 2b is the same as that shown in FIG. 2a except that the structure of network security device 240 is shown in more detail.

In the embodiment shown in FIG. 2b, network security device 240 comprises layer 2 modules 245a-c, layer 3 uplink virtual switch 221 and layer 3 module 250. Each of layer 2 modules 245a-c has a layer 2 trunk connected to one of port groups 225a-c. Each of layer 2 modules 245a-c provides layer 2 security management to network traffic of a zone that is connected to one of port groups 225a-225c. Layer 3 uplink virtual switch 221 connects layer 2 modules 245a-c and layer 3 module 250. When an inter-zone data packet needs layer 3 scanning, the inter-zone data packet first goes through layer 2 scanning at any one of layer 2 module 245a-c. Then, layer 3 uplink virtual switch 221 sends the inter-zone data packet to layer 3 module 250. In layer 3 module 250, the inter-zone data packet is scanned based on security policies of layer 3 module.

Figure 2C:
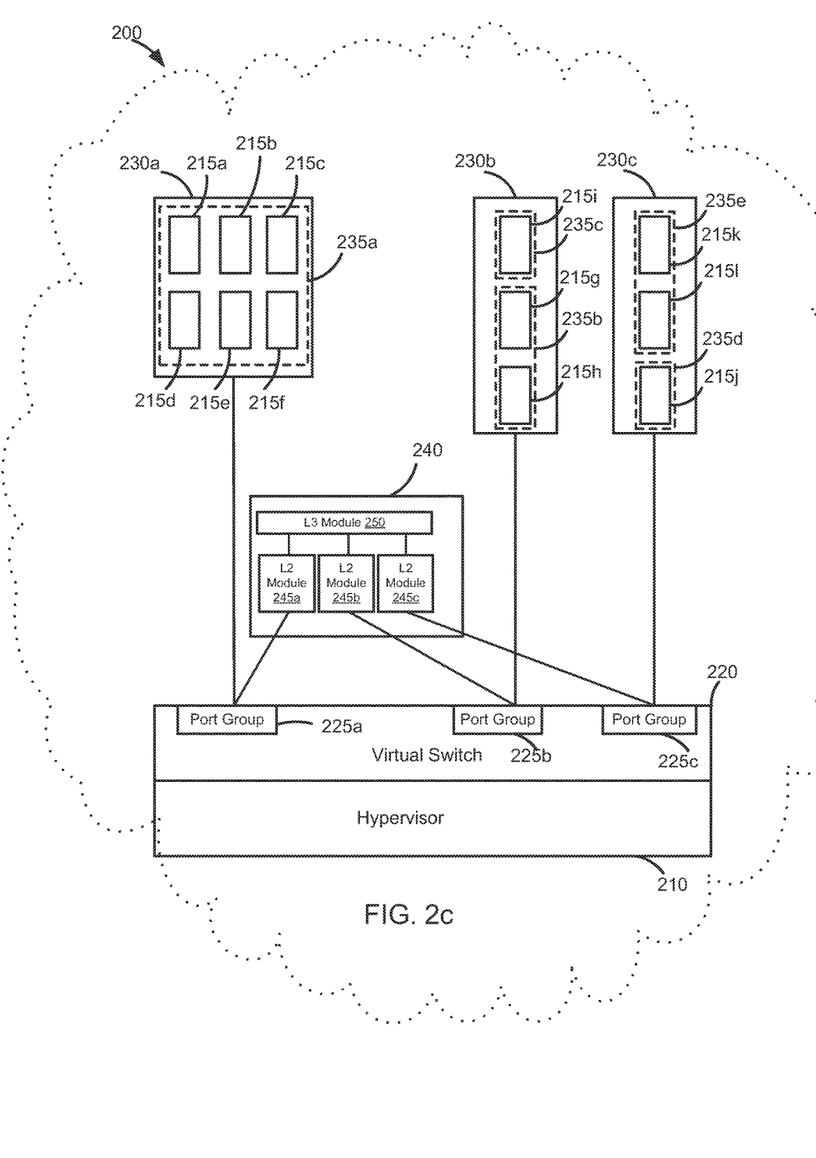
FIG. 2c is a block diagram conceptually illustrating an exemplary virtual environment in which various embodiments of the present invention may be employed.

FIG. 2c is a block diagram conceptually illustrating an exemplary virtual environment 200 in which embodiments of the present invention may be employed. The virtual environment 200 in FIG. 2b is the same as that shown in FIG. 2a except that the structure of network security device 240 is shown in more detail.

Figure 3:
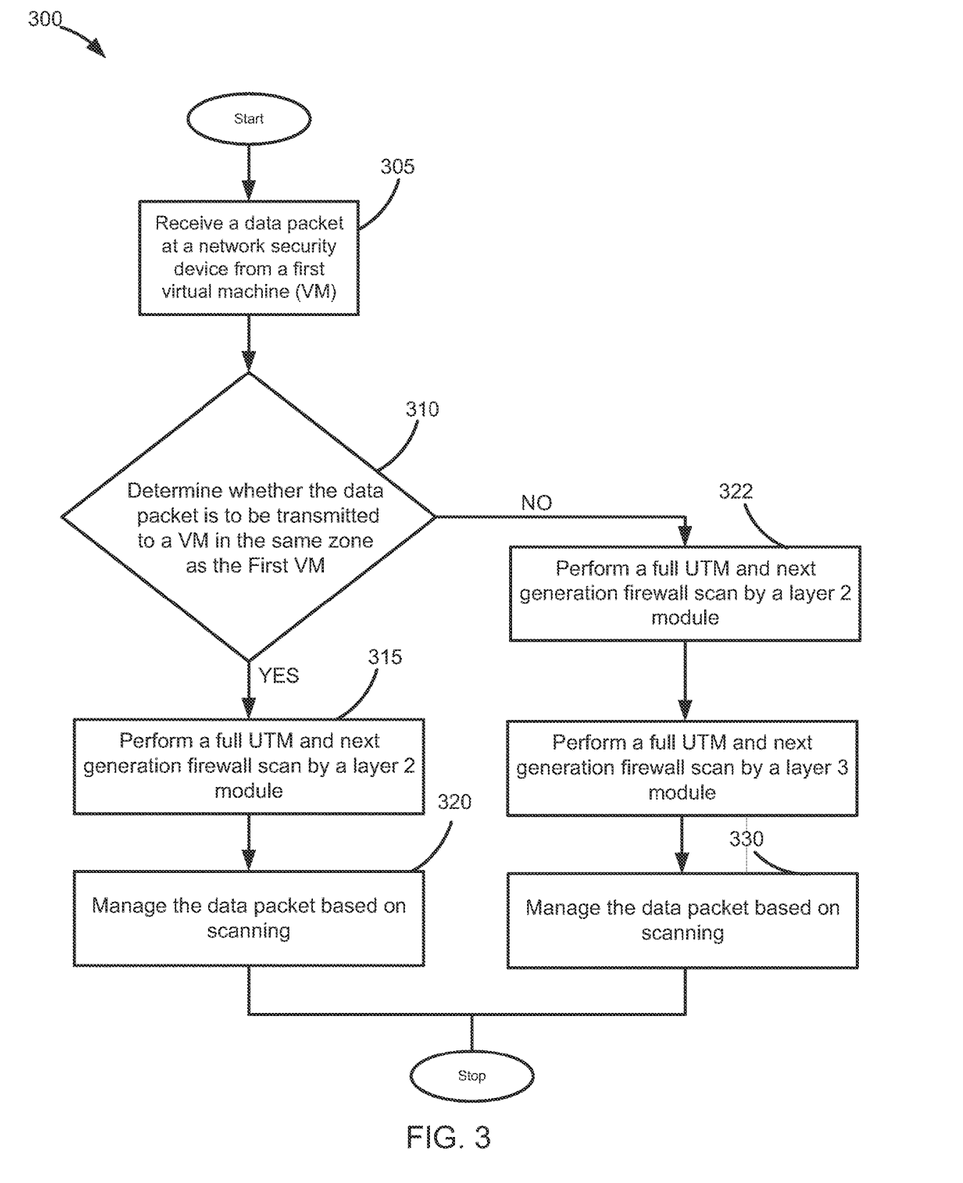
FIG. 3 is a flow diagram illustrating a method for providing security in a virtual environment in accordance with an embodiment of the present invention.

In the embodiment shown in FIG. 2c, network security device 240 comprises layer 2 modules 245a-c and layer 3 module 250. Each of layer 2 modules 245a-c has a layer 2 trunk connected to one of port groups 225a-c and provides layer 2 security management to network traffic from a zone that is connected to one of port group 225a-225c. Each of layer 2 modules 245a-c has an inter-VDOM link with layer 3 module 250. When an inter-zone data packet needs layer 3 scanning, the inter-zone data packet first goes through layer 2 scanning at any one of layer 2 module 245a-c. Then, the inter-zone network traffic is transmitted to layer 3 module 250 through the inter-VDOM link between layer 3 module 250 and a layer 2 module. Layer 3 module performs layer 3 scanning to the inter-zone network traffic based on its policies. By sending inter-zone network traffic directly from layer 2 module to layer 3 module through a inter-VDOM link, inter-zone network traffic does not need Application Program Interface (API) provided by vendors of hypervisor for being transmitting to layer 3 scanning FIG. 3 is a flow diagram illustrating a method for providing security in a virtual environment in accordance with an embodiment of the present invention. At step 305, a data packet, transmitted by a virtual machine, is received at a network security device, Thereafter, at step 310, the network security device determines whether the data packet is to be transmitted to a virtual machine in the same zone as of the transmitting virtual machine. In other words, the network security device determines whether the data packet constitutes intra-zone traffic or inter-zone traffic. The network security device and intra-zone or inter-zone arrangement of virtual machines in a network is explained in detail in conjunction with FIG. 2a-2c.

Based on the determination at step 310, the data packet is allocated for processing either to a layer 2 module or to a local layer 2 module and a layer 3 module. These modules perform security scans on the incoming traffic. If it is determined that the data packet is to be transmitted to a virtual machine in the same zone, then the data packet is scanned by layer 2 module, at step 315. The layer 2 module, then, performs scanning based on security profile settings. In an embodiment, a full unified threat management (UTM) and a full next generation firewall scan may be performed on the data packet. Further, the scan may be performed via a flow-based inspection and a proxy based inspection. The scan includes features like network intrusion prevention, antivirus, anti-spam, content, load balancing, data leak prevention, and on-appliance reporting. Thereafter, the layer 2 module manages the data packet based on the scanning, as shown in step 320.

In contrast to the above explained determination, if it is determined that the receiving virtual machine is in a different zone, then the data packet is scanned by local layer 2 module, at step 322. Next, the data packet is scanned by the layer 3 module, at step 325. The layer 3 module performs scanning based on security profile settings. In an embodiment, the layer 3 module executes a full next generation firewall scan and a unified threat management scan on the data packet. The security scan is performed to determine application, user, and content of the data packet. These three attributes may be determined using stateful inspection, flow-based inspection and proxy based inspection. Thereafter, based on the scanning the data packet is managed, in step 330. Thus, the network security device is able to manage security threats and apply policies associated with inter-zone and intra-zone traffic in a virtual network.

Figure 4:
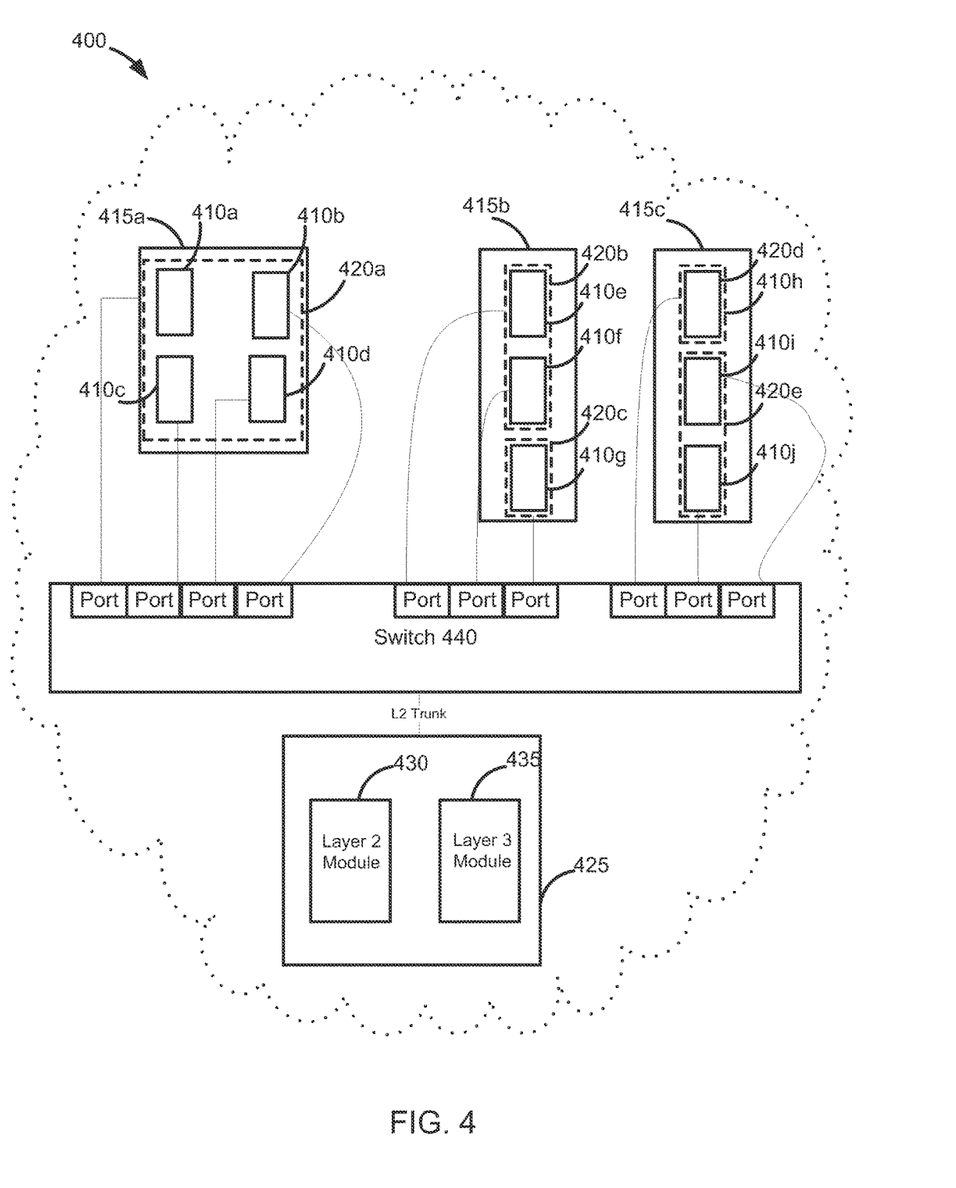
FIG. 4 is a block diagram conceptually illustrating an exemplary physical environment in which various embodiments of the present invention may be employed.

FIG. 4 is a block diagram illustrating an exemplary physical environment 400 in which embodiments of the present invention may be employed. Examples of a physical network may include but are not limited to a data center, a wide area network, storage/server networks, and an office network. Physical environment 400 includes a plurality of computing devices, such as a computing device 410a, a computing device 410b, and a computing device 410n. Examples of a computing device include, but are not limited to, a server, a personal computer (PC), a printer, a cellular phone, a television, an office work station, and so forth.

The plurality of computing devices communicate with each other via a physical switch 440. Physical switch 440 may include ports, hubs, switches, and/or routers depending on the requirements of the physical environment 400. In the present embodiment each computing device has a port associated with it which helps receiving and transmitting traffic to and from the computing device. For example, port 445a is associated with computing device 410a, port 445b is associated with computing device 410b, and so forth.

In addition, the plurality of computing devices are divided in sets to form sub-network or subnet or zone within physical environment 400. For example, computing device 410a to computing device 410d form zone 415a, computing device 410e to computing device 410g form zone 415b, and computing device 410h to computing device 410j form zone 415c. The plurality of zones within physical environment 400 may be connected through a gateway, a router, a bus, a tunnel, and so forth. Further, within each zone a set of computing devices maybe logically grouped to form local area networks (LANs). In the example of FIG. 4, computing devices 410a to computing device 410d form LAN 420a, computing devices 410e and computing device 410f form LAN 420b, and similarly, LAN 420c, LAN 420d, and LAN 420e are formed. It should be noted that the LAN 420b and LAN 420c are in same zone 415b and LAN 420d and LAN 240e are in same zone 415c. The physical switch 440 enables communication between the various LANs.

In addition, physical environment 400 includes a network security device 425 to monitor communication between the plurality of computing devices. In an embodiment, network security device 425 may be a separate entity coupled to physical switch 440, as shown in FIG. 4. In another embodiment, network security device 425 may be integrated with the physical switch 440 which may include gateway, switches, routers, and so forth. Network security device 425 scans all data packets communicated from one computing device to another computing device in physical environment 400.

Network security device 425 may be divided into plurality of threat management modules which are capable of providing security management with different security profiles. These threat management modules are configured to cater the plurality of computing devices based on inter-zone and intra-zone location of the computing devices.

When a data packet is received at network security device 425, network security device 425 determines an appropriate threat management module and allocates the data packet to the threat management module for scanning. The determination includes analyzing whether receiving computing device is in a different zone as the transmitting computing device.

If it is determined that the receiving computing device is in a same zone as the transmitting computing device, then the data is scanned using a layer 2 module 430. Layer 2 module 430 operates in a transparent mode and performs a flow-based inspection and a proxy based inspection. Based on the scanning, layer 2 module 430 provides full UTM and NGFW scan to all intra-zone traffic. It should be noted that each LAN has a layer 2 module associated with it. Layer 2 module 430 scans the traffic for possible security threats and manages threats within a zone.

However, if the receiving computing device is in a different zone as the transmitting computing device, then scanning is performed by a layer 3 module 435. Therefore, layer 3 module 435 provides inter-zone security. To provide inter-zone security, layer 3 module 435 operates in the NAT/route mode. Further, layer 3 module 435 performs a NGFW and UTM scan on the data packets received by it using stateful inspection, flow-based inspection, and proxy based inspection. The details of layer 3 module 435 have already been explained in conjunction with FIGS. 1-3.

Upon scanning the data packets, an appropriate policy associated with the data packet is determined. It should be noted that each policy provides instructions that specify how to manage the data packets. Therefore, on determining the policy associated with the data packet, layer 3 module manages the data packets accordingly. Subsequently, the data packet may or may not be sent to the destination computing device based on the instructions associated with the policy. In this way, layer 3 module is able to monitor traffic, block external probes, defend against denial of service attacks, inspect traffic and also inspect content and perform filtering. And hence, layer 3 module is able to provide security in physical environment 400.

Further, in an exemplary embodiment of the present disclosure, consider a network comprises a first LAN present in a first zone and a second LAN present in a second zone. In accordance to this example, three threat management modules may be associated with such an arrangement. The first threat management module would be a layer 2 module which will manage data flowing within the first zone. The second threat management module will be a layer 2 module which will manage data flowing within the second zone. And third threat management module will be a layer 3 module which will manage data flowing between the first zone and the second zone.

Moreover, whenever a new LAN is to be added to physical environment 400, network security device 425 is configured to add the new LAN. Therefore, each LAN will have a threat management module associated with it. In addition, network security device 425 may be configured by a network administrator. This would eliminate the need to change the configuration of other threat management modules. The threat management modules within network security device 425 are capable of performing scans on the data traffic passing through network security device 425.

Figure 5:
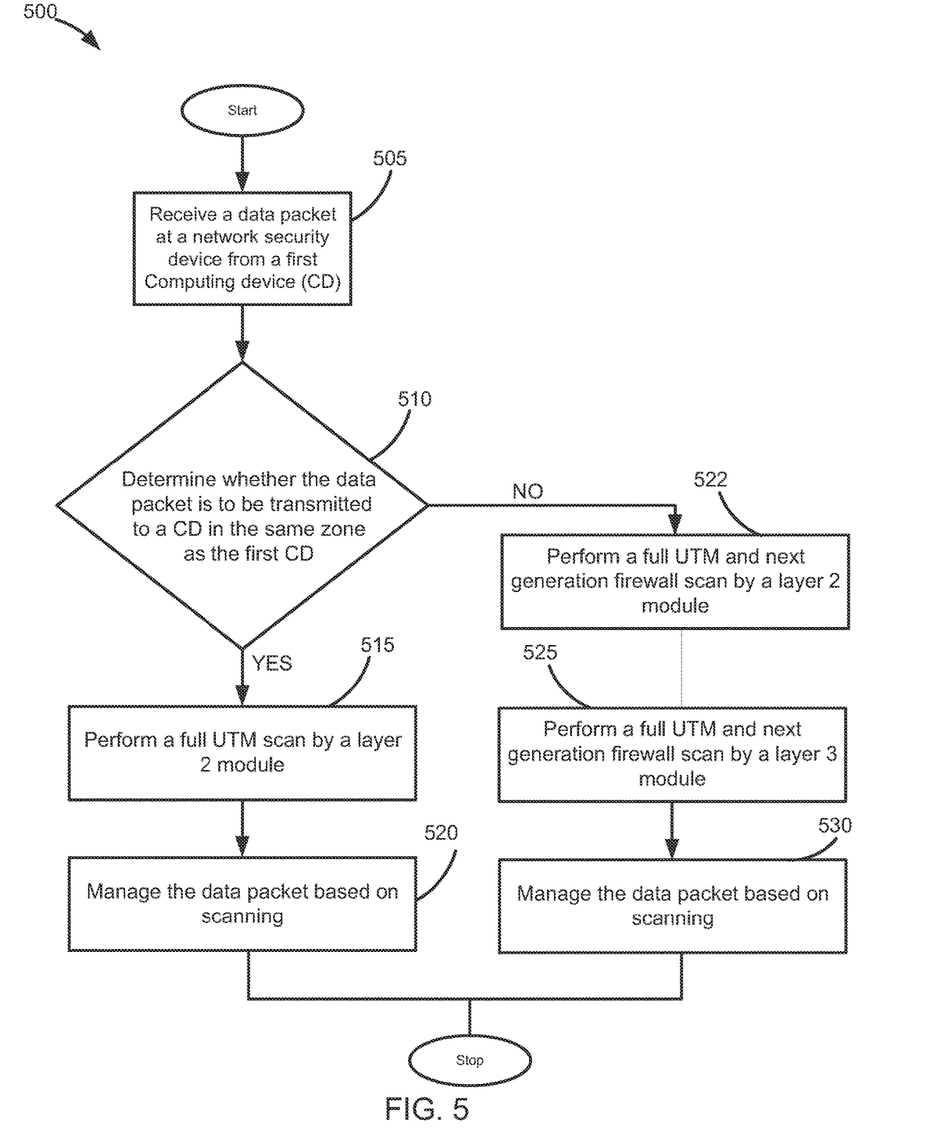
FIG. 5 is a flow diagram illustrating a method for providing security in a physical environment in accordance with an embodiment of the present invention.

Similar to FIG. 3, FIG. 5 illustrates a flowchart for providing security in a physical environment or network in accordance with an embodiment of the present invention. The physical environment may be a Local Area Network (LAN), a Wide Area Network (WAN), a Metropolitan Network (MAN) and the like. The physical environment may include a plurality of computing devices in communication with each other. The computing device may be a computer, a laptop, a mobile phone, and the like.

At step 510, a network security device receives a data packet from a first computing device. The data is to be transmitted to a second computing device as the first computing device is in communication with the second computing device. All data packets traversing the physical environment pass through the network security device and the network security device provides security to the physical environment by scanning and managing data for threats and violations. The network security device is explained in detail in conjunction with FIGS. 1 and 4.

After receiving the data, the network security device determines, at step 510, whether the second computing device is in a zone same as that of the first computing device. If the second computing device belongs to the same zone, then the scanning is performed by the layer 2 module, at step 515. Thereafter based on the scanning, the data packet is managed by the layer 2 module, at step 520. However, if the second computing device belongs to different zones then the scanning is first performed by a local layer 2 module, at step 522. Thereafter, the scanning is performed by layer 3 module, as shown in step 525. After the scanning, the layer 3 module manages the data packet, in step 530. Details of the layer 2 module, the layer 3 module and intra-zone or inter-zone arrangement of communication devices in the network are explained in conjunction with FIGS. 1, 2, and 4. In this way, using the layer 2 module and the layer 3 module the network security device is able to provide security in the physical environment.

Figure 6:
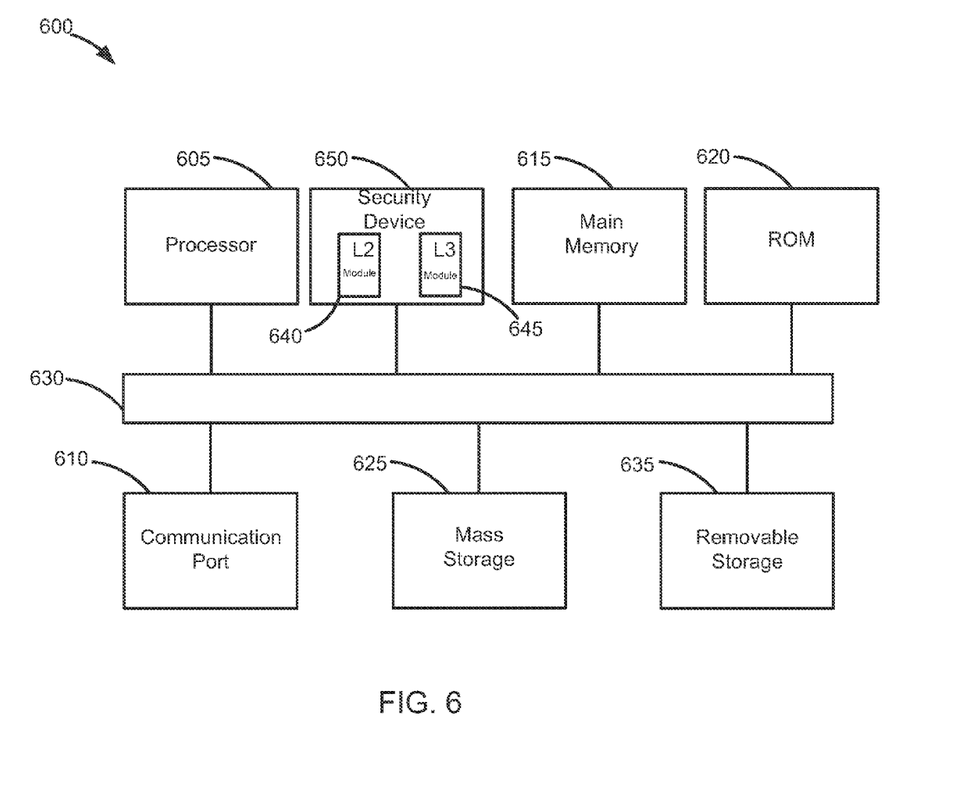
FIG. 6 is an exemplary network security device with which embodiments of the present disclosure may be utilized.

FIG. 6 is an exemplary network security device 600 with which embodiments of the present disclosure may be utilized. As shown, network security device 600 includes a processor 605, communication port 610, a main memory 615, a read only memory 620, a mass storage 625, a bus 630 and a removable storage media 635. A person skilled in the art will appreciate that network security device 600 may include more than one processor and communication ports. In addition, network security device 600 may be sub-divided into two or more units such that the units may be able to function independently and are able to provide security to the respective networks. Further, network security device 650 may include a security module 650.

Examples of processor 605 include, but are not limited to, an Intel® Itanium® or Itanium 2 processor(s), or AMD® Opteron® or Athlon MP® processor(s), or Motorola® lines of processors or other future processors.

Communication port 610 can be any of an RS-232 port for use with a modem based dialup connection, a 10/100 Ethernet port, a Gigabit port using copper or fiber, a serial port, a parallel port, or other existing or future ports. Communication port 610 may be chosen depending on a network, such a Local Area Network (LAN), Wide Area Network (WAN), or any network to which network security device 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 635 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with threat management device 600. Other operator and administrative interfaces can be provided through network connections connected through communication port 610.

Removable storage media 635 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Security module 650 can be a FortiGate® or any gateway device that can provide security in a virtual as well as a physical environment. It should be noted that security module 650 may be implemented as a separate ASIC module or a software module.

Security module 650 may include layer 2 module 640 and layer 3 module 645. Layer 2 module 640 performs antivirus scanning, web filtering, and spam filtering, and also provides intrusion protection on inter virtual machine traffic. Layer 3 module 645 performs NGFW and UTM scans on inter zone traffic. In addition, both the layer 2 module 640 and layer 3 module 645 manage traffic passing through them based on the scanning Therefore, network security device 600 is able to monitor traffic, block external probes, defend against denial of service attacks, inspect traffic and also inspect content and perform filtering. In addition, layer 2 module 640 and layer 3 module 645 also perform switching and routing functions, respectively.

Components described above are meant only to exemplify various possibilities. In no way should the aforementioned exemplary computer system limit the scope of the present disclosure.

Various embodiments of the present disclosure enable threat management within a network. The network security device provides complete network segregation at both layer 2 and layer 3; and s, therefore, able to efficiently manage traffic within a network. Further, layer 2 modules and layer 3 modules within the network security device enable role based administration and help in managing and enabling overlapping subnets. They also help in mixing transparent and NAT/route security systems to protect computing devices and separating a network into isolated administrative domains.

While embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method of performing security scanning within a virtual environment, the method comprising:
assigning a first security policy to a first plurality of virtual machines (VMs) hosted by a hypervisor of a host machine by creating, within a network security device, a first layer 2 (L2) virtual domain (VDOM) with which the first plurality of VMs are associated, wherein the first L2 VDOM has implemented therein a first L2 scanning module to apply the first security policy to inter-VM traffic exchanged among the first plurality of VMs, wherein the first plurality of VMs are within a first common L2 broadcast domain as a result of being part of a first virtual local area network (VLAN) or as a result of being coupled in communication with the hypervisor through a first common port group of a plurality of port groups of a virtual switch of the host machine;
assigning a second security policy to a second plurality of VMs hosted by the hypervisor by creating, within the network security device, a second L2 VDOM with which the second plurality of VMs are associated, wherein the second L2 VDOM has implemented therein a second L2 scanning module to apply the second security policy to inter-VM traffic exchanged among the second plurality of VMs, wherein the second plurality of VMs are within a second common L2 broadcast domain as a result of being part of a second VLAN or as a result of being coupled in communication with the hypervisor through a second common port group of the plurality of port groups;
receiving, by the network security device, a first packet originated by a first VM of the first plurality of VMs and directed to a second VM of the first plurality of VMs;
responsive to determining both a source and a destination of the first packet are associated with the first L2 VDOM, causing, by the network security device, the first L2 scanning module to apply security scanning to the first packet in accordance with a first set of security rules associated with the first security policy prior to forwarding the first packet to the second VM of the first plurality of VMs;
receiving, by the network security device, a second packet originated by a first VM of the second plurality of VMs and directed to a second VM of the second plurality of VMs; and
responsive to determining both a source and a destination of the second packet are associated with the second L2 VDOM, causing, by the network security device, the second L2 scanning module to apply security scanning to the second packet in accordance with a second set of security rules associated with the second security policy prior to forwarding the second packet to the second VM of the second plurality of VMs.

2. The method of claim 1, wherein the security scanning in accordance with the first set of security rules comprises one or more of unified threat management (UTM) scanning and next generation firewall (NGFW) scanning.

3. The method of claim 1, wherein the security scanning in accordance with the second set of security rules comprises one or more of unified threat management (UTM) scanning and next generation firewall (NGFW) scanning.

4. The method of claim 1, wherein the network security device comprises a virtual gateway device integrated within the virtual switch.

5. A non-transitory computer-readable storage medium embodying a set of instructions, which when executed by a network security device, cause the network security device to perform a method for security scanning within a virtual environment, the method comprising:
assigning a first security policy to a first plurality of virtual machines (VMs) hosted by a hypervisor of a host machine by creating a first layer 2 (L2) virtual domain (VDOM) with which the first plurality of VMs are associated, wherein the first L2 VDOM has implemented therein a first L2 scanning module to apply the first security policy to inter-VM traffic exchanged among the first plurality of VMs, wherein the first plurality of VMs are within a first common L2 broadcast domain as a result of being part of a first virtual local area network (VLAN) or as a result of being coupled in communication with the hypervisor through a first common port group of a plurality of port groups of a virtual switch of the host machine;
assigning a second security policy to a second plurality of VMs hosted by the hypervisor by creating a second L2

VDOM with which the second plurality of VMs are associated, wherein the second L2 VDOM has implemented therein a second L2 scanning module to apply the second security policy to inter-VM traffic exchanged among the second plurality of VMs, wherein the second plurality of VMs are within a second common L2 broadcast domain as a result of being part of a second VLAN or as a result of being coupled in communication with the hypervisor through a second common port group of the plurality of port groups;

receiving a first packet originated by a first VM of the first plurality of VMs and directed to a second VM of the first plurality of VMs;

responsive to determining both a source and a destination of the first packet are associated with the first L2 VDOM, causing the first L2 scanning module to apply security scanning to the first packet in accordance with a first set of security rules associated with the first security policy prior to forwarding the first packet to the second VM of the first plurality of VMs;

receiving a second packet originated by a first VM of the second plurality of VMs and directed to a second VM of the second plurality of VMs; and responsive to determining both a source and a destination of the second packet are associated with the second L2 VDOM, causing the second L2 scanning module to apply security scanning to the second packet in accordance with a second set of security rules associated with the second security policy prior to forwarding the second packet to the second VM of the second plurality of VMs.

6. The non-transitory computer-readable storage medium of claim 5, wherein the security scanning in accordance with the first set of security rules comprises one or more of unified threat management (UTM) scanning and next generation firewall (NGFW) scanning.

7. The non-transitory computer-readable storage medium of claim 5, wherein the security scanning in accordance with the second set of security rules comprises one or more of unified threat management (UTM) scanning and next generation firewall (NGFW) scanning.

8. The non-transitory computer-readable storage medium of claim 1, wherein the network security device comprises a virtual gateway device integrated within the virtual switch.

9. A method of performing security scanning within a physical environment, the method comprising:

assigning a first security policy to a first plurality of computing devices within a network by creating, within a network security device, a first layer 2 (L2) virtual domain (VDOM) with which the first plurality of computing devices are associated, wherein the first L2 VDOM has implemented therein a first L2 scanning module to apply the first security policy to traffic exchanged among the first plurality of computing devices, wherein the first plurality of computing devices are within a first common L2 broadcast domain as a result of being part of a first virtual local area network (VLAN);

assigning a second security policy to a second plurality of computing devices within the network by creating, within the network security device, a second layer 2 (L2) virtual domain (VDOM) with which the second plurality of computing devices are associated, wherein the second L2 VDOM has implemented therein a second L2 scanning module to apply the second security policy to traffic exchanged among the second plurality of computing devices, wherein the second plurality of computing devices are within a second common L2 broadcast domain as a result of being part of a second VLAN;

receiving, by the network security device, a first packet originated by a first computing device of the first plurality of computing devices and directed to a second computing device of the first plurality of computing devices;

responsive to determining both a source and a destination of the first packet are associated with the first L2 VDOM, causing, by the network security device, the first L2 scanning module to apply security scanning to the first packet in accordance with a first set of security rules associated with the first security policy prior to forwarding the first packet to the second computing device of the first plurality of computing devices;

receiving, by the network security device, a second packet originated by a first computing device of the second plurality of computing devices and directed to a second computing device of the second plurality of computing devices; and responsive to determining both a source and a destination of the second packet are associated with the second L2 VDOM, causing, by the network security device, the second L2 scanning module to apply security scanning to the second packet in accordance with a second set of security rules associated with the second security policy prior to forwarding the second packet to the second computing device of the second plurality of computing devices.

10. The method of claim 5, wherein the security scanning in accordance with the first set of security rules comprises one or more of unified threat management (UTM) scanning and next generation firewall (NGFW) scanning.

11. The method of claim 5, wherein the security scanning in accordance with the second set of security rules comprises one or more of unified threat management (UTM) scanning and next generation firewall (NGFW) scanning.

12. The method of claim 5, wherein the network security device comprises a physical gateway device coupled in communication with the first plurality of computing devices and the second plurality of computing devices via an intervening physical switch.

13. A non-transitory computer-readable storage medium embodying a set of instructions, which when executed by one or more processors of a network security device, cause the one or more processors to perform a method for security scanning within a physical environment, the method comprising:

assigning a first security policy to a first plurality of computing devices within a network by creating a first layer 2 (L2) virtual domain (VDOM) with which the first plurality of computing devices are associated, wherein the first L2 VDOM has implemented therein a first L2 scanning module to apply the first security policy to traffic exchanged among the first plurality of computing devices, wherein the first plurality of computing devices are within a first common L2 broadcast domain as a result of being part of a first virtual local area network (VLAN);

assigning a second security policy to a second plurality of computing devices within the network by creating a second layer 2 (L2) virtual domain (VDOM) with which the second plurality of computing devices are associated, wherein the second L2 VDOM has implemented therein a second L2 scanning module to apply the second security policy to traffic exchanged among the second plurality of computing devices, wherein the second plurality of computing devices are within a second common L2 broadcast domain as a result of being part of a second VLAN;

receiving a first packet originated by a first computing device of the first plurality of computing devices and directed to a second computing device of the first plurality of computing devices;

responsive to determining both a source and a destination of the first packet are associated with the first L2 VDOM, causing the first L2 scanning module to apply security scanning to the first packet in accordance with a first set of security rules associated with the first security policy prior to forwarding the first packet to the second computing device of the first plurality of computing devices;

receiving a second packet originated by a first computing device of the second plurality of computing devices and directed to a second computing device of the second plurality of computing devices; and responsive to determining both a source and a destination of the second packet are associated with the second L2 VDOM, causing the second L2 scanning module to apply security scanning to the second packet in accordance with a second set of security rules associated with the second security policy prior to forwarding the second packet to the second computing device of the second plurality of computing devices.

14. The non-transitory computer-readable storage medium of claim 13, wherein the security scanning in accordance with the first set of security rules comprises one or more of unified threat management (UTM) scanning and next generation firewall (NGFW) scanning.

15. The non-transitory computer-readable storage medium of claim 13, wherein the security scanning in accordance with the second set of security rules comprises one or more of unified threat management (UTM) scanning and next generation firewall (NGFW) scanning.

16. The non-transitory computer-readable storage medium of claim 13, wherein the network security device comprises a physical gateway device coupled in communication with the first plurality of computing devices and the second plurality of computing devices via an intervening physical switch.

* * * * *